United States Patent [19]
Nuang

[11] Patent Number: 5,991,481
[45] Date of Patent: Nov. 23, 1999

[54] OPTICAL ISOLATOR

[75] Inventor: Yidong Nuang, Tokyo, Japan

[73] Assignee: NEC Corporation, Tokyo, Japan

[21] Appl. No.: 08/848,558

[22] Filed: Apr. 28, 1997

[30] Foreign Application Priority Data

Apr. 30, 1996 [JP] Japan ................................. 8-109062

[51] Int. Cl.⁶ .................................................. G02B 6/34
[52] U.S. Cl. ................................ 385/37; 385/10; 359/237
[58] Field of Search .................................. 385/8, 37, 31, 385/27, 132, 28, 10; 359/246, 249, 282, 283, 324, 237, 573

[56] References Cited

U.S. PATENT DOCUMENTS

| | | | |
|---|---|---|---|
| 4,351,709 | 9/1982 | Goetz | 356/28 |
| 4,736,382 | 4/1988 | O'Meara | 372/32 |
| 4,868,385 | 9/1989 | Nishimura | 250/231 SE |
| 5,050,993 | 9/1991 | Tansey | 356/356 |
| 5,227,625 | 7/1993 | Hetzler | 359/573 |
| 5,283,795 | 2/1994 | Fink | 372/32 |
| 5,323,001 | 6/1994 | Igaki et al. | 250/231.16 |
| 5,442,172 | 8/1995 | Chiang et al. | 250/237 |
| 5,537,210 | 7/1996 | Kaneda et al. | 356/356 |
| 5,540,230 | 7/1996 | Vilkomerson | 188/662.04 |
| 5,657,304 | 8/1997 | Lehureau | 369/109 |
| 5,751,403 | 5/1998 | Mitzutani et al. | 355/53 |

FOREIGN PATENT DOCUMENTS

| | | |
|---|---|---|
| 62-176184 | 8/1987 | Japan . |
| 64-46022 | 2/1989 | Japan . |
| 1-134423 | 5/1989 | Japan . |
| 2-239896 | 9/1990 | Japan . |
| 3-296710 | 12/1991 | Japan . |
| 4-93815 | 3/1992 | Japan . |
| 4-97118 | 3/1992 | Japan . |
| 6-250130 | 9/1994 | Japan . |
| 9-269516 | 10/1997 | Japan . |

OTHER PUBLICATIONS

Japanese Office Action dated Mar. 24, 1998 with English language translation of Japanese Examiner's comments.

T. Shintaku; "Higher–Order–Mode–Converted Optical Waveguide Isolator"; Fifth Optoelectronics Conference (OEC '94) Technical Digest, Jul. 1994, Makuhari Messe, pp. 354–355.

*Primary Examiner*—John D. Lee
*Assistant Examiner*—Ellen E. Kang
*Attorney, Agent, or Firm*—Whitham, Curtis & Whitham

[57] ABSTRACT

An optical isolator, which has: a medium through which a light transmits and in which a dynamic diffraction grating that periodically repeats a refractive index distribution is formed; wherein the dynamic diffraction grating causes a propagation loss difference between an incident light which is supplied into the medium and a returning light which is supplied into the medium in a direction reverse to the incident light.

15 Claims, 6 Drawing Sheets

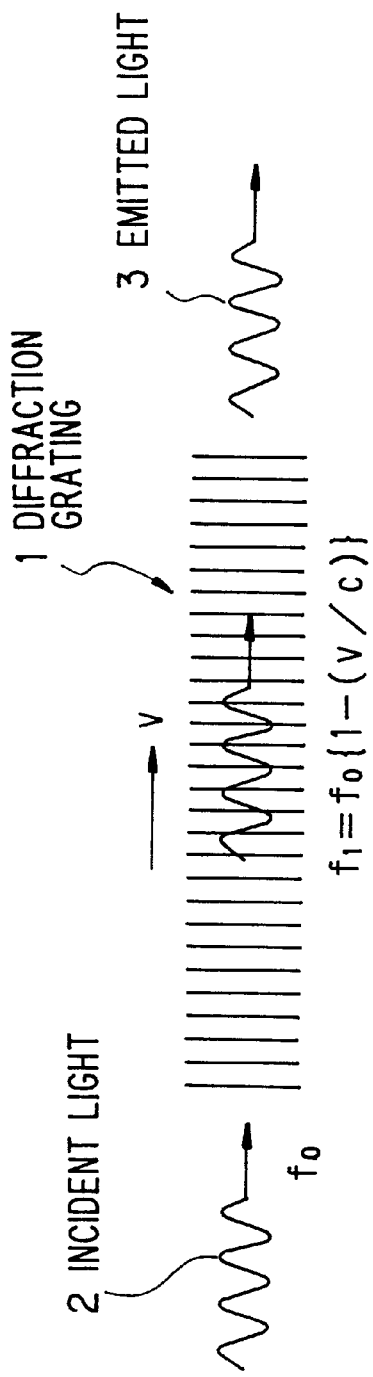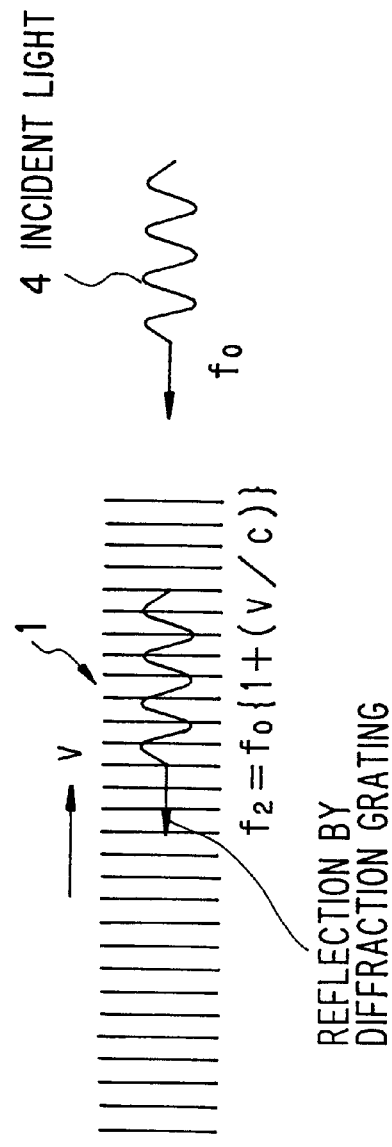

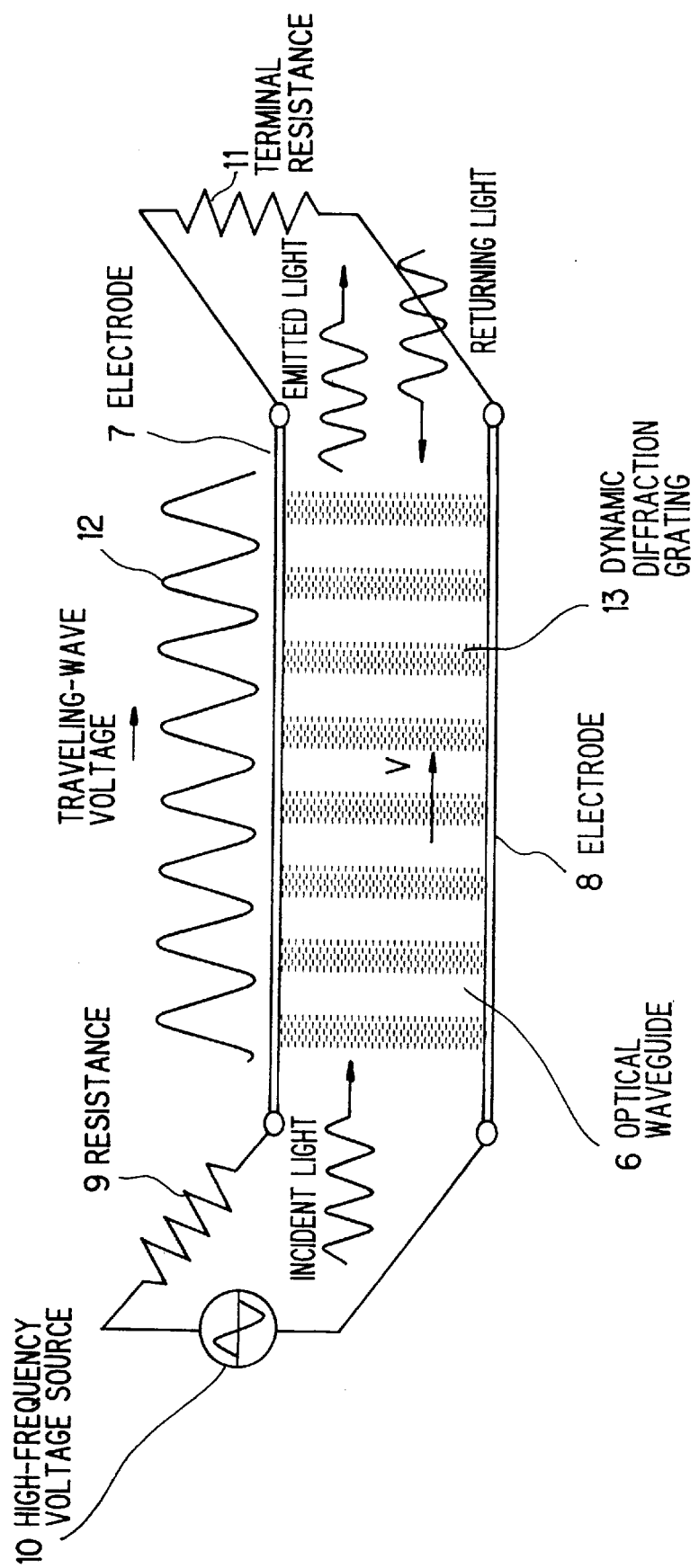

OPTICAL ISOLATOR

FIELD OF THE INVENTION

This invention relates to an optical isolator, and more particularly to, an optical waveguide type integrated optical isolator.

BACKGROUND OF THE INVENTION

Semiconductor lasers are widely used as a light source for ultra-high speed and long distance optical fiber communication. However, due to a little reflecting-back light from an optical fiber, there occurs a noise in conventional semiconductor lasers. Because of this, an optical isolator needs to be always used as an optics component for removing the reflecting-back light to the semiconductor laser.

In general, conventional optical isolators comprise a magnetooptic crystal with Faraday effect and two polarizers which are disposed sandwiching the magnetooptic crystal and have polarization planes shifted 45° to each other, in the conventional optical isolators, light emitted from a semiconductor laser is transmitted through the first polarizer, entered into the magnetooptic crystal, where the polarization plane is rotated 45° in a predetermined direction, then transmitted through the second polarizer without being attenuated. On the other hand, reflecting-back light is transmitted through the second polarizer, entered into the magnetooptic crystal, where the polarization plane is further rotated 45° in the predetermined direction. Thereby, the polarization plane of the reflecting-back light is shifted by 90° to the polarization plane of the first polarizer, therefore the first polarizer can prevent the reflecting-back light from entering into the semiconductor laser.

However, in the conventional optical isolators, it is required to prepare at least four elements including a magnet and fabricate them, therefore they are very costly.

Moreover, it is, in fact, difficult for the conventional optical isolator to be monolithically integrated with the semiconductor laser.

SUMMARY OF THE INVENTION

Accordingly, it is an object of the invention to provide an optical isolator whose production cost can be significantly reduced.

It is a further object of the invention to provide an optical isolator which can be monolithically integrated with a semiconductor laser.

According to the invention, an optical isolator, comprises:
a medium through which a light transmits and in which a dynamic diffraction grating that periodically repeats a refractive index distribution is formed;
wherein the dynamic diffraction grating causes a propagation loss difference between an incident light which is supplied into the medium and a returning light which is supplied into the medium in a direction reverse to the incident light.

According to another aspect of the invention, an optical isolator, comprises:
a cylindrical light-transmitting medium in which a periodical refractive index distribution is formed in the direction of a radius of the medium; and
means for rotating the cylindrical light-transmitting medium;
wherein an incident light is supplied to a circumferential surface of the cylindrical light-transmitting medium.

Furthermore, according to another aspect of the invention, an optical isolator, comprises:
an optical waveguide into which a light can be led and in which a diffraction grating that is formed as a wave traveling with a periodical refractive index distribution in a predetermined direction is formed;
wherein the diffraction grating causes a propagation loss difference between an incident light which is supplied into the optical waveguide and a returning light which is supplied into the optical waveguide in a direction reverse to the incident light.

Furthermore, according to another aspect of the invention, an optical isolator, comprises:
an optical waveguide composed of a material that can be monolithically with a semiconductor laser;
first and second electrodes which are formed both sides of the optical waveguide;
a terminal resistance which is connected to terminals of the first and second electrodes and is set to match with a characteristic impedance of a line with the first and second electrodes; and
a voltage source which applies a high-frequency voltage to opposite ends to the terminals of the first and second electrodes;
wherein an incident light is supplied into the optical waveguide.

Furthermore, according to another aspect of the invention, an optical isolator, comprises:
an optical waveguide with an acoustooptic characteristic;
a comb-like electrode which is formed on the optical waveguide; and
a voltage source which applies a high-frequency voltage to the comb-like electrode to induce an ultrasonic wave in the optical waveguide, whereby a diffraction grating that travels with a periodical refractive index variation in a predetermined direction is formed in the optical waveguide;
wherein an incident light is supplied into the optical waveguide.

BRIEF DESCRIPTION OF THE DRAWINGS

The invention will be explained in more detail in conjunction with the appended drawings, wherein:

FIGS. 1A and 1B are illustrations for explaining the principle of the invention;

FIG. 2 is an illustration for explaining a detailed theoretical composition of the invention;

DESCRIPTION OF THE PREFERRED EMBODIMENTS

Figure 3:
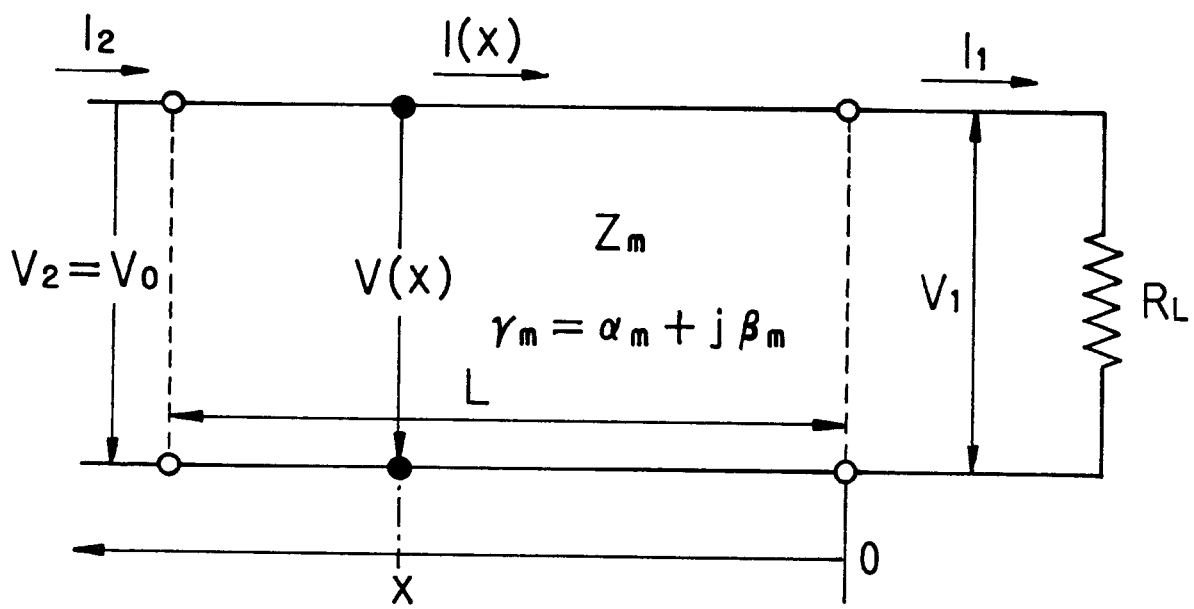
FIG. 3 is an equivalent circuit diagram to the composition in FIG. 2.

Before explaining optical isolators in the preferred embodiments, the principle of the invention will be explained in FIGS. 1A and 1B.

When an incident light 2 with a frequency of $f_0$ is entered into a diffraction grating 1 which is, as shown in FIG. 1A, moving at a relative velocity v in the same direction as the propagation direction of the incident light 2, a frequency of the incident light 2 when observed from the diffraction grating 1 becomes $f_1(=f_0(1-(v/c))$, where c represents a velocity of light in free space, to be lower than $f_0$, due to Doppler effect.

On the other hand, when the diffraction grating 1 is, as shown in FIG. 1B, moving in the direction reverse to the propagation direction of an incident light 4, a frequency of the incident light 4 when observed from the diffraction grating 1 becomes $f_2(=f_0(1+(v/c))$ to be higher than $f_0$, due to Doppler effect. Therefore, If the pitch of the diffraction grating 1 is designed to transmit only a light wave with the frequency $f_1$, the light 3 can be, in case of FIG. 1A, emitted from the diffraction grating 1, while the light will be, in case of FIG. 1B, reflected by the diffraction grating 1. Thus, a light-transmitting medium, in which the diffraction grating 1 with a refractive index distribution periodically repeated is formed, can function as an optical isolator when it is moved in a space to cause Doppler effect.

On the other hand, according to another aspect of the invention, an optical isolator, comprises:

an optical waveguide into which a light can be led and in which a diffraction grating that is formed as a wave traveling with a periodical refractive index distribution in a predetermined direction is formed;

wherein the diffraction grating causes a propagation loss difference between an incident light which is supplied into the optical waveguide and a returning light which is supplied into the optical waveguide in a direction reverse to the incident light.

FIG. 2 shows a theoretical composition of an optical isolator according to the aspect of the invention. As shown in FIG. 2, this optical isolator comprises an optical waveguide 6 made of an electrooptic material, electrodes 7, 8 formed on both sides of the optical waveguide 6, a high-frequency voltage source 10 connected to terminals of the electrodes 7, 8 through a resistance 9, and a terminal resistance 11 connected to the other terminals of the electrodes 7, 8, where the electrodes 7, 8 are used as a transmission line for a traveling-wave voltage 12.

FIG. 3 is an equivalent circuit of the composition in FIG. 2, where $Z_M$ and $Z_L$ are a characteristic impedance and a terminal resistance, respectively when regarded as a distributed constant circuit, and $\gamma_M$ is a propagation constant given by:

$$\gamma_M = \alpha_M + \beta_M \ldots \quad (1)$$

where $\alpha_M$ is an attenuation constant and $\beta_M$ is a phase constant. $V_1$ and $I_1$ are a voltage and a current, respectively at the terminal, and $V_2$ and $I_2$ are a voltage and a current, respectively at the incident end. A device length is L, and x represents a distance from the terminal resistance $R_L$ (corresponding to 11 in FIG. 2).

From the basic equation as to voltage and current of a distributed constant circuit, a voltage at an optional position x on the distributed constant circuit, V(x), is, using the incident end voltage $V_2 = V_g$, given by:

$$V(x) = \frac{V_g}{(R_L + Z_m)e^{\gamma mL} + (R_L - Z_m)e^{-\gamma mL}} [(R_L + Z_m)e^{\gamma mx} + (R_L - Z_m)e^{-\gamma mx}] \quad (2)$$

If $V_g$ is the sine function of an angular frequency $\omega$, the phase constant $\beta_M$ of the propagation constant $\gamma_M$ is given by:

$$\beta_M = (\omega/c)n_M = \omega/v_M \ldots \quad (3)$$

where c is the propagation velocity of an electromagnetic wave in a free space and $n_M$ is an effective refractive index to the voltage wave.

The first term on the right side of equation (2) represents a voltage wave traveling from the incident end to the terminal. The second term on the right side of equation (2) is considered as a voltage pulse traveling from the terminal to the incident end, i.e., reflecting wave. As seen from equation (2), if the terminal resistance $R_L$ is set to be equal to the characteristic impedance $Z_M$, the impedance matching can be completely obtained, therefore there occurs no reflecting wave at the terminal. In this case, the voltage distribution is given by:

$$V(x) = V_g e^{-\gamma M(L-x)} \ldots \quad (4)$$

Namely, only the traveling-wave voltage from the incident end from the terminal can be obtained.

By supplying such traveling-wave voltage 12, a dynamic diffraction grating 13 that a wave with the refractive index variation of the material moves at a high velocity can be formed in the optical waveguide 6. Further, utilizing Doppler effect as shown in FIG. 1, it can be operated as an optical isolator.

Next, an optical isolator in the first preferred embodiment will be explained in FIG. 4.

Figure 4:
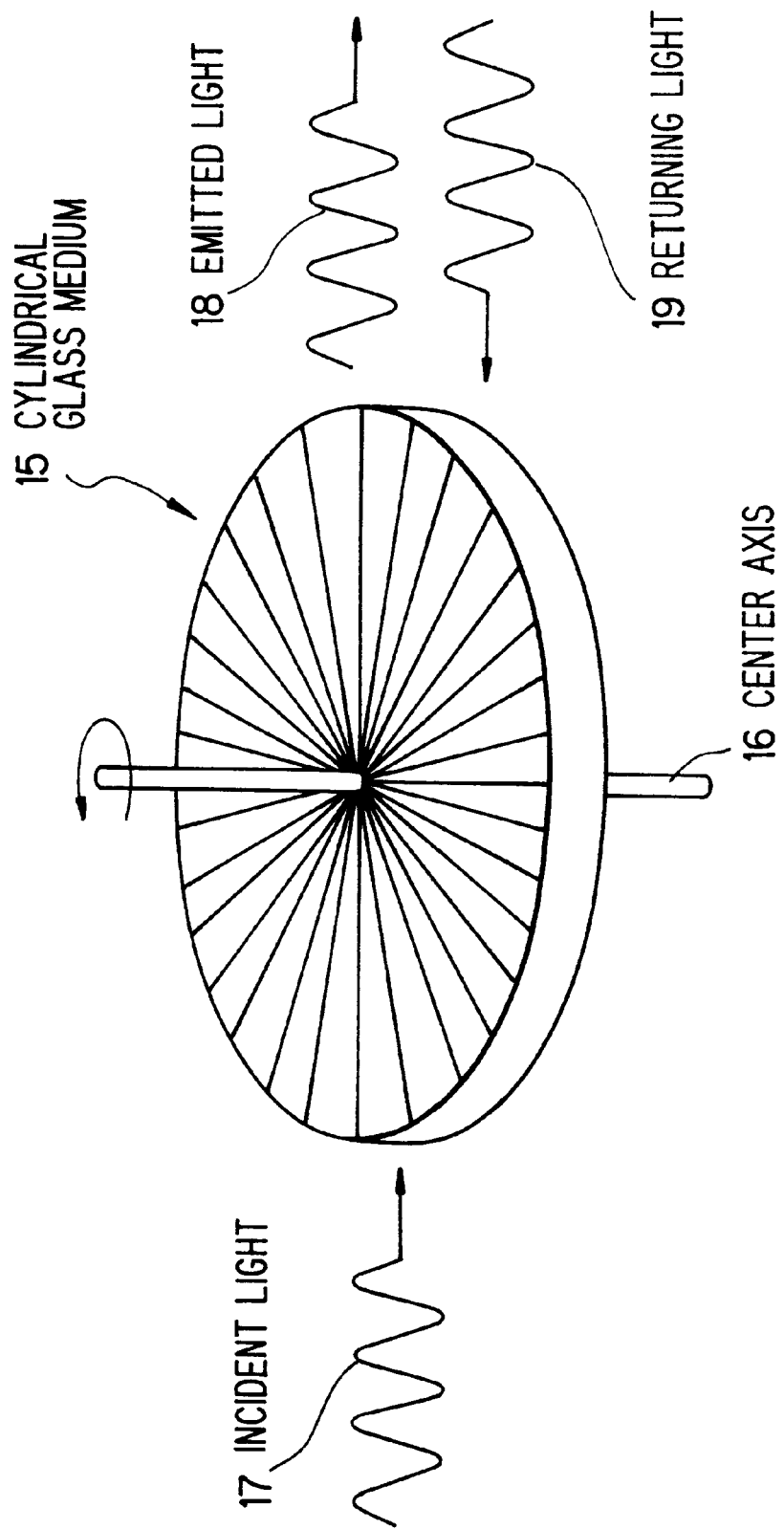
FIG. 4 is a schematic perspective view showing an optical isolator in a first preferred embodiment according to the invention.

As shown in FIG. 4, a cylindrical glass medium 15 has different refractive index distribution regions formed periodically in the radius direction to periodically change the refractive index distribution. This glass medium 15 is provided with a center axis 16 penetrating through and fixing at its center, and it is rotated at a high velocity in the direction shown by an arrow in FIG. 4.

When an incident light 17 is supplied onto the side wall of the glass medium 15 from one side of the glass medium 15 which is turning at the high velocity, the glass medium 15 functions as a diffraction grating that moves at the high velocity in the glass medium 15 in the same direction as the propagation direction of the incident light 17. Thus, due to Doppler effect, only the incident light with a certain frequency can be, as explained in FIG. 1, emitted as an emitted light 18. Also, a returning light 19 cannot be transmitted through the glass medium 15.

Here, to get a shift amount of frequency, $\Delta f = |f_1 - f_2| = f_0/1000$ in the incident light 17 based on Doppler effect, a moving velocity more than $1.5 \times 10^5$ m/s of the diffraction grating is required in view of the aforementioned equations, $f_1 = f_0(1-(v/c))$ and $f_2 = f_0(1+(v/c))$. Thus, if the radius of the glass medium 15 is 10 mm, the rotation velocity required is about $2.4 \times 10^6/S (= 1.5 \times 10^5/(2 \times \pi \times 10 \times 10^{-3}))$.

By supplying a light into the high-speed rotating cylindrical glass medium 15, about 20 dB isolation can be obtained. Meanwhile, since the cylindrical glass medium 15 can have different linear velocities depending on radius positions even when having the same rotation velocity, i.e., the moving velocity v of the diffraction grating can be changed depending on the incidence position of the incident light 17 to the glass medium 15, a frequency that a light wave can transmit can be changed by varying the incidence position of the incident light 17 to the glass medium 15.

As described above, in the first embodiment, without using conventional materials with an non-reciprocal optical effect such as a magnetoodtic effect, magnet etc., an optical isolator can be composed of standard semiconductor materials.

An optical isolator in the second preferred embodiment will be explained in FIG. 5.

Figure 5:
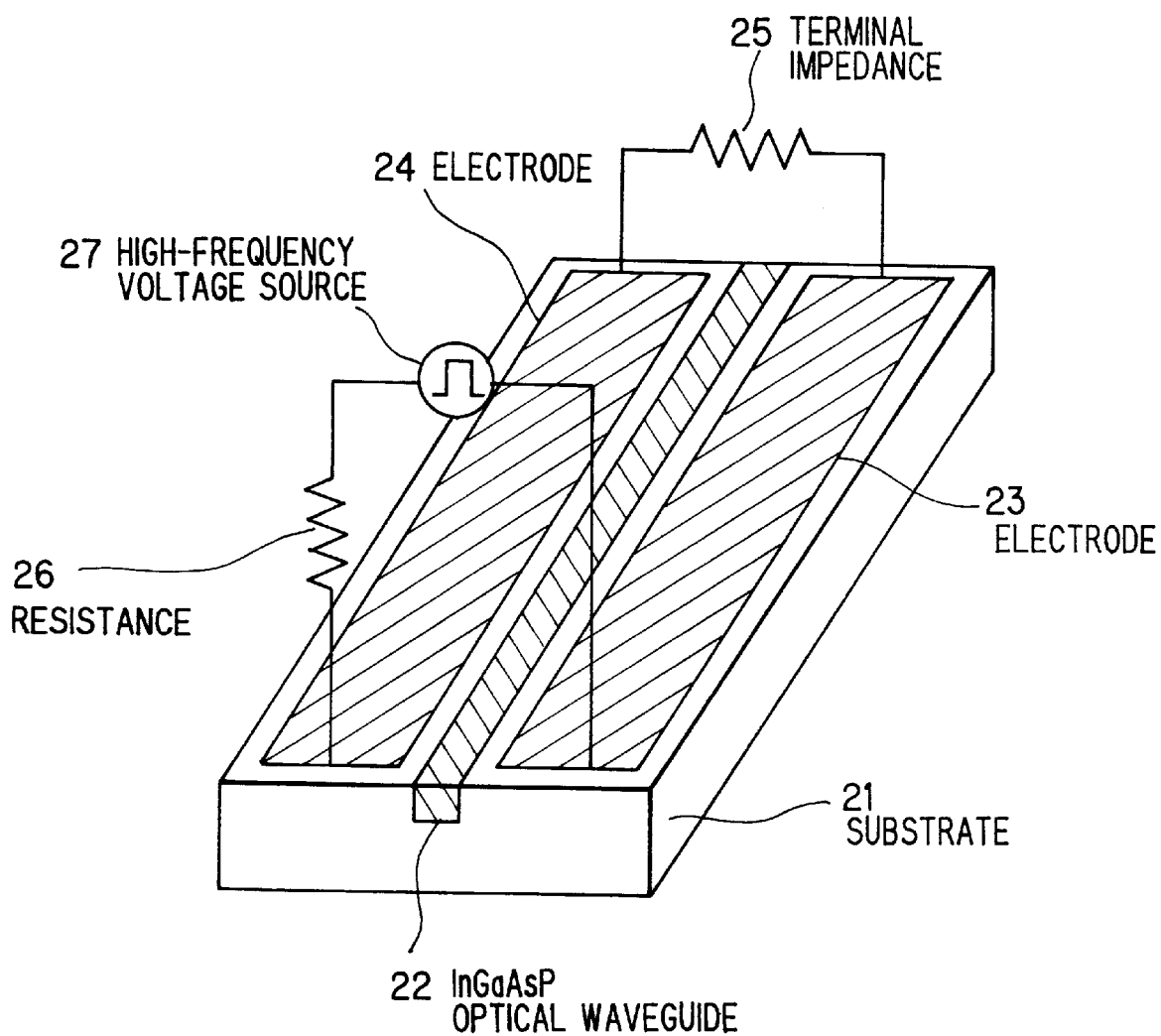
FIG. 5 is a schematic perspective view showing an optical isolator in a second preferred embodiment according to the invention.

As shown in FIG. 5, a 0.2 $\mu$m thick InGaAsP four-element layer is grown on a substrate 21 composed of InP that can be monolithically integrated with a long wavelength semiconductor laser, then, by a standard photolithography and etching, a 3 $\mu$m wide ridge-stripe optical waveguide 22 is formed. Further, both sides of the optical waveguide 22 are buried by growing InP. Then, electrodes 23, 24 are vapor-deposited on both sides of the ridge-stripe optical waveguide 22.

The device length L is set to be about 1 mm, thereby the characteristic impedance $Z_M$ of about 50 $\Omega$ can be obtained. Though a large isolation characteristic can be, of course, obtained by increasing the device length L, the waveguide loss will be increased. In this embodiment, a terminal impedance of 50 $\Omega$ is connected to the terminals of the electrodes 23, 24 to match the characteristic impedance $Z_M$. To the other ends of the electrodes 23, 24, a resistance 26 and a high-frequency voltage source 27 are connected in series.

In the second embodiment, according to the operational principle as explained with reference to FIGS. 2 and 3, only the traveling-wave voltage from the incidence ends of the electrodes 23, 24(corresponding to the electrodes 7, 8 in FIG. 2) to the terminal can be obtained, and a dynamic diffraction grating that a wave with the refractive index variation of the material moves at a high velocity can be formed in the optical waveguide 22. Thus, when a light wave with a frequency of $f_0$ is supplied into the incidence end of the optical waveguide 22, due to Doppler effect, only the light wave with a frequency of $f_1$ can be transmitted through, and the returning light with a predetermined frequency of $f_2$ can be removed.

Here, in case of using InP materials with a dielectric constant of 12.4, the moving velocity of the dynamic diffraction grating is about 0.39 c. Thereby, the frequencies $f_1$, $f_2$ become $0.61f_0$ and $1.39f_0$, respectively. In this case, to an incident light with a wavelength of 1.3 $\mu$m, the pitch of the dynamic diffraction grating that a light with a wavelength of $f_1$ can be transmitted through and a light with a wavelength of $f_2$ can be removed from is about 1500 Å. Therefore, the frequency of the injected traveling voltage wave output from the high-frequency voltage source 27 is set to be $7 \times 10^{14}$ Hz.

As described above, in the second embodiment, without using conventional materials with an non-reciprocal optical effect such as a magnetooptic effect, magnet etc., an optical isolator can be composed of standard semiconductor materials. Also, it can be monolithically integrated with a semiconductor laser, thereby the cost of an optical module requiring an optical isolator can be significantly reduced.

Though the optical isolator in the second embodiment is applied to an incident light with a wavelength of 1.3 $\mu$m, an optical isolator in the second embodiment may be also monolithically integrated with a semiconductor laser with a wavelength of 1.5 $\mu$m by adjusting the frequency of the high-frequency voltage source 27.

An optical isolator in the third preferred embodiment will be explained in FIGS. 6A and 6B.

Figure 6A:
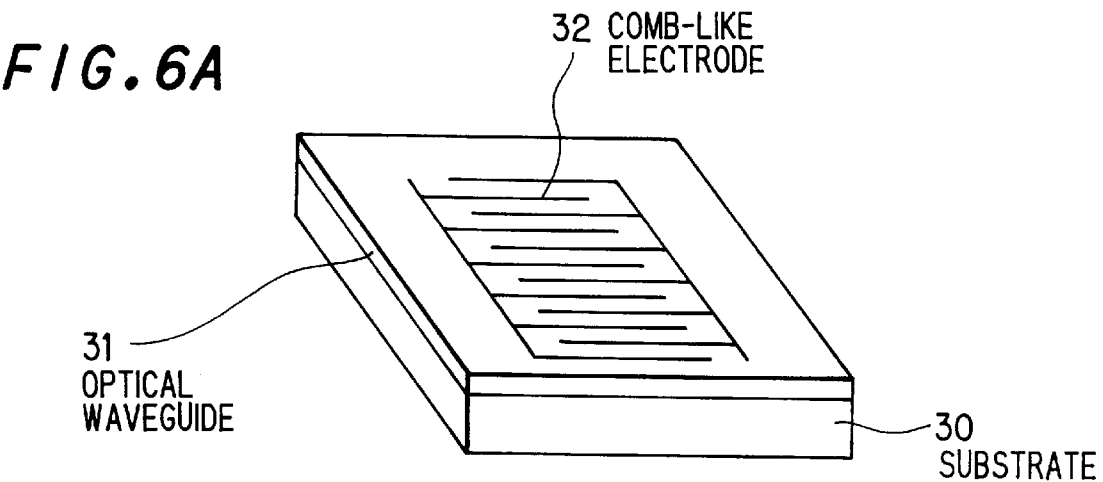
FIG. 6A is a schematic perspective view showing an optical isolator in a third preferred embodiment according to the invention.

As shown in FIG. 6A, the optical isolator in the third embodiment comprises an optical waveguide 31 formed on a substrate 30 which is composed of a medium with an acoustooptic characteristic, such as LiIO3, LiNbO3, and a comb-like electrode 32 formed on the optical waveguide 31. A high-frequency voltage is applied to the comb-like electrode 32 from a high-frequency voltage source(not shown).

Figure 6B:
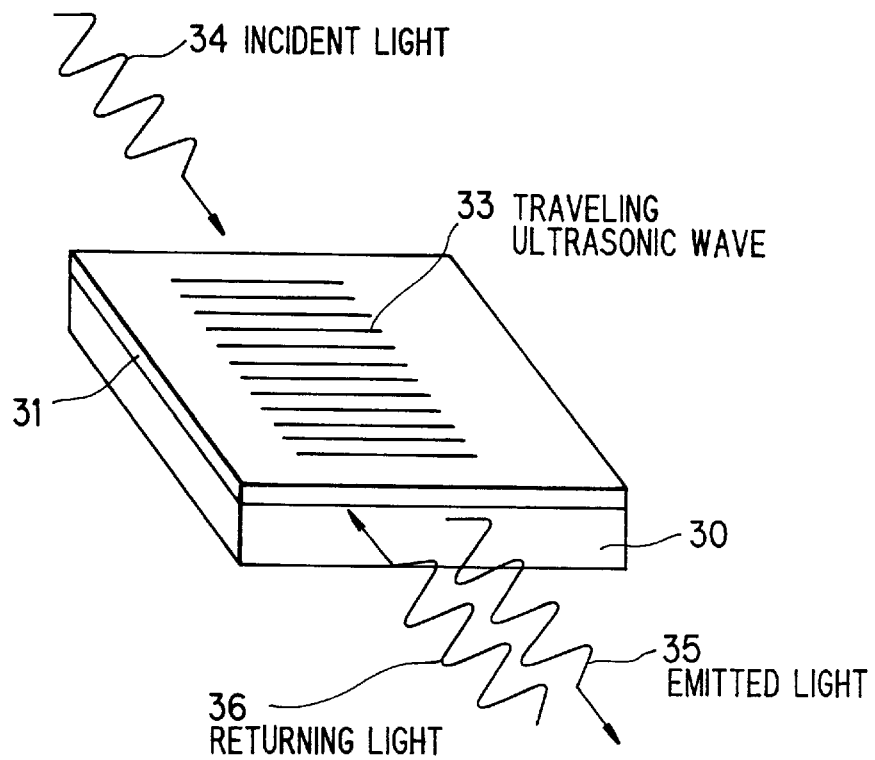
FIG. 6B is a schematic perspective view for explaining an operation of the optical isolator in FIG. 6A.

In the third embodiment, by the high-frequency voltage, a traveling ultrasonic wave 33 is, as shown in FIG. 6B, induced in the optical waveguide 31 as the acoustooptic medium, whereby a dynamic diffraction grating that a refractive index is periodically varied and moved in a specific direction can be formed in the optical waveguide 31.

When an incident light 34 is supplied into the diffraction grating, due to Doppler effect, only a light wave 35 with a predetermined frequency of $f_1$ can be transmitted through, and a returning light 36 with a predetermined frequency of $f_2$ can be removed from. Thus, it can function as an optical isolator. Also in the third embodiment, without using conventional materials with an non-reciprocal optical effect such as a magnetooptic effect, magnet etc., an optical isolator can be composed of standard semiconductor materials.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical isolator, comprising:

a medium in which a dynamic diffraction grating that periodically repeats a refractive index distribution is formed, said dynamic diffraction grating having a pitch so as to transmit only light of a predetermined frequency, thereby causing a propagation loss difference between an incident light which is supplied into said medium at said predetermined frequency and a returning light which is supplied into said medium in a direction reverse to said incident light and at a frequency different from said predetermined frequency, said dynamic diffraction grating not transmitting said returning light.

2. The optical isolator of claim 1, further comprising:

means for moving said dynamic diffraction grating at a predetermined velocity and in a same direction as a direction of propagation of said incident light.

3. The optical isolator of claim 2, wherein said pitch, which causes said dynamic diffraction grating to transmit said predetermined frequency, is based on said predetermined velocity at which said dynamic diffraction grating is moved by said means.

4. The optical isolator of claim 3, wherein said dynamic diffraction grating moving at said predetermined velocity and in said predetermined direction produces Doppler shifts in said incident light and said returning light.

5. The optical isolator of claim 4, wherein said propagation loss difference is caused by the Doppler shifts in said incident light and said returning light, such that as a result of said Doppler shifts, said incident light approaching a first side of said medium attains said predetermined frequency and said returning light approaching a second side of said medium in said reverse direction attains said different frequency.

6. An optical isolator, comprising:

a cylindrical light-transmitting medium in which a periodical refractive index distribution is formed in a direction of a radius of said medium; and means for rotating said cylindrical light-transmitting medium;

wherein an incident light is supplied to a circumferential surface of said cylindrical light-transmitting medium, said means rotating said cylindrical light-transmitting medium in a same direction as a direction of propagation of said incident light and at a velocity sufficient to create a diffraction grating which transmits said incident light at a predetermined frequency and which does not transmit a returning light which is supplied to the circumferential surface of said cylindrical light-transmitting medium at a frequency different from said predetermined frequency.

7. The optical isolator of claim 6, wherein movement of said diffraction grating produces a Doppler shift in said incident light which causes said incident light to attain said predetermined frequency and a Doppler shift in said returning light which causes said returning light to attain said frequency different from said predetermined frequency.

8. The optical isolator of claim 7, wherein said predetermined frequency is based on a position at which said incident light impinges on said cylindrical light-transmitting medium, so that a change in said position changes a frequency which said diffraction grating transmits.

9. An optical isolator, comprising:

an optical waveguide into which a light can be led and in which a diffraction grating that is formed as a wave traveling with a periodical refractive index distribution in a predetermined direction is formed, said diffraction grating having a pitch so as to transmit only light of a predetermined frequency, thereby causing a propagation loss difference between an incident light which is supplied into said optical waveguide at said predetermined frequency and a returning light which is supplied into said optical waveguide in a direction reverse to said incident light and at a frequency different from said predetermined frequency, said diffraction grating not transmitting said returning light.

10. The optical isolator of claim 9, further comprising:

means for moving said wave at a predetermined velocity, said predetermined direction of said wave being same as a direction of propagation of said incident light.

11. The optical isolator of claim 10, wherein said pitch, which causes said diffraction grating to transmit said predetermined frequency, is based on said predetermined velocity at which said wave is made to travel by said means.

12. The optical isolator of claim 11, wherein said diffraction grating moving at said predetermined velocity and in said predetermined direction produces Doppler shifts in said incident light and said returning light.

13. The optical isolator of claim 12, wherein said propagation loss difference is caused by the Doppler shifts in said incident light and said returning light, such that as a result of said Doppler shifts, said incident light approaching a first side of said optical waveguide attains said predetermined frequency and said returning light approaching a second side of said optical waveguide in said reverse direction attains said different frequency.

14. The optical isolator of claim 13, wherein said optical waveguide includes:

an electro-optic material;

first and second electrodes disposed on opposing sides of said electro-optic material, said first and second electrodes forming a transmission line which produces said wave as a voltage wave traveling at said predetermined velocity and in said predetermined direction within said electro-optic material, said voltage wave having peaks and valleys which define the pitch of said diffraction grating for passing said incident light at said predetermined frequency.

15. The optical isolator of claim 14, further comprising:

wherein the transmission line formed by said first and second electrodes is impedance matched by a terminal resistance across respective end terminals of said first and second electrodes, said terminal resistance equaling a characteristic impedance of the transmission line so as to prevent a reflecting wave from forming at said respective end terminals.

\* \* \* \* \*

UNITED STATES PATENT AND TRADEMARK OFFICE
CERTIFICATE OF CORRECTION

PATENT NO. : 5,991,481
DATED : November 23, 1999
INVENTOR(S) : Yidong Huang

It is certified that error appears in the above-identified patent and that said Letters Patent is hereby corrected as shown below:

On the title page item [75], line 1, delete "Nuang" and insert – Huang –.

Signed and Sealed this

Fifteenth Day of August, 2000

*Attest:*

Q. TODD DICKINSON

*Attesting Officer*    *Director of Patents and Trademarks*